US009549540B2

(12) United States Patent
Ikuta et al.

(10) Patent No.: US 9,549,540 B2
(45) Date of Patent: Jan. 24, 2017

(54) DUAL-BEARING REEL

(71) Applicant: Shimano Inc., Sakai, Osaka (JP)

(72) Inventors: Takeshi Ikuta, Osaka (JP); Kunio Takechi, Osaka (JP); Takuji Takamatsu, Osaka (JP); Akira Niitsuma, Osaka (JP); Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/099,098

(22) Filed: Apr. 14, 2016

(65) Prior Publication Data

US 2016/0345559 A1 Dec. 1, 2016

(30) Foreign Application Priority Data

May 27, 2015 (JP) ................................. 2015-107018

(51) Int. Cl.
*A01K 89/01* (2006.01)
*A01K 89/0155* (2006.01)
*F16C 19/54* (2006.01)

(52) U.S. Cl.
CPC ....... *A01K 89/0187* (2015.05); *A01K 89/0155* (2013.01); *F16C 19/54* (2013.01)

(58) Field of Classification Search
CPC A01K 89/0155; A01K 89/0182; A01K 89/05; A01K 89/058; A01K 89/059
See application file for complete search history.

(56) References Cited

U.S. PATENT DOCUMENTS

| 5,746,381 | A | * | 5/1998 | Miyazaki | A01K 89/015 192/69.63 |
|---|---|---|---|---|---|
| 5,875,986 | A | * | 3/1999 | Miyazaki | A01K 89/015 242/261 |
| 5,988,547 | A | * | 11/1999 | Koelewyn | A01K 89/015 242/246 |
| 6,053,444 | A | * | 4/2000 | Yamaguchi | A01K 89/015 242/275 |
| 2001/0038052 | A1 | * | 11/2001 | Oishi | A01K 89/015 242/255 |
| 2002/0017441 | A1 | * | 2/2002 | Kemp, III | F16D 41/08 192/45.008 |
| 2005/0162976 | A1 | * | 7/2005 | Kuriyama | A01K 89/00 367/111 |
| 2005/0247809 | A1 | * | 11/2005 | Terauchi | A01K 89/017 242/250 |
| 2014/0183292 | A1 | * | 7/2014 | Kaneko | A01K 89/0108 242/234 |

FOREIGN PATENT DOCUMENTS

| JP | GB 2251535 A | * | 7/1992 | ........... A01K 89/015 |
|---|---|---|---|---|
| JP | 2007-104958 A | | 4/2007 | |

* cited by examiner

*Primary Examiner* — Emmanuel M Marcelo
(74) *Attorney, Agent, or Firm* — Global IP Counselors

(57) ABSTRACT

A dual-bearing reel includes a reel body, a spool, a spool shaft, a one-way clutch, and an operating lever. The spool is rotatable relative to the reel body. The spool shaft is configured to integrally rotate with the spool. The one-way clutch comprises an outer ring that is rotatable relative to the reel body and a rolling body configured to transmit rotation of the spool shaft in the casting direction to the outer ring, the one-way clutch being attached to the spool shaft. The operating lever is attached to the reel body, extends in a radial direction, and is configured to adjust a braking force that brakes rotation of the outer ring.

9 Claims, 6 Drawing Sheets

100 # DUAL-BEARING REEL

CROSS-REFERENCE TO RELATED APPLICATIONS

This application claims priority based on Japanese Patent Application No. 2015-107018, filed in the Japan Patent Office on May 27, 2015, the contents of which is hereby incorporated herein by reference.

BACKGROUND

Field of the Invention

The present invention relates to a dual-bearing reel.

Background Information

In general, a dual-bearing reel includes a casting control mechanism (for example, refer to Japanese Laid-Open Patent Publication No. 2007-104958). A casting control mechanism is a mechanism for braking a rotation of a spool shaft by applying frictional force to the spool shaft. Accordingly, the rotation speed of the spool shaft is suppressed at the time of line delivering to prevent backlash.

SUMMARY

A casting control mechanism such as that described above acts not only during line delivering (casting), but also during line winding (reeling). Consequently, rotational resistance can occurring at the time of reeling.

The object of the present invention is to provide a dual-bearing reel that is capable of suppressing the generation of rotational resistance during reeling.

The dual-bearing reel according to one aspect of the present invention comprises a reel body, a spool, a spool shaft, a one-way clutch, and an operating lever. The spool is rotatable relative to the reel body. The spool shaft can be integrally rotated with the spool. The one-way clutch is attached to the spool shaft. The one-way clutch comprises an outer ring and a rolling body. The outer ring is rotatable relative to the reel body. The rolling body transmits the rotation of the spool shaft in the casting direction to the outer ring. The operating lever is attached to the reel body and extends in the radial direction. The operating lever is a member for adjusting the braking force that brakes the rotation of the outer ring.

According to this configuration, if the spool shaft is rotated in the casting direction, the rotation of the spool shaft is transmitted to the outer ring via the rolling body. That is, the spool shaft and the outer ring are rotated together. Since the outer ring is braked by the operating lever, the spool shaft is also braked thereby. As a result, the rotation speed of the spool shaft is suppressed at the time of casting to prevent backlash. On the other band, if the spool shaft is rotated in the reeling direction, the rotation of the spool shaft is not transmitted to the outer ring. That is, since the spool shaft and the outer ring are not rotated together, the spool shaft is not braked. Accordingly, it is possible to suppress generation of rotational resistance in the spool shaft at the time of reeling, and the spool shaft can be smoothly rotated.

Further, the operating lever for adjusting the braking force with respect to this outer ring extends in the radial direction. Accordingly, it is possible to operate the operating lever while palming.

Preferably, the operating lever is pivotably attached to the reel body. This configuration enables the braking force to be adjusted by pivoting the operating lever.

Preferably, the operating lever is attached to the reel body and presses the outer ring in the axial direction.

Preferably, the dual-bearing reel further comprises a friction plate that is disposed between the outer ring and the operating lever.

Preferably, the dual-bearing reel further comprises a biasing member that biases the outer ring toward the operating lever.

Preferably, the operating lever comprises a cylindrical portion and a lever portion. The cylindrical portion is attached to the reel body, and is capable of moving in the axial direction by rotation. The lever portion extends from the cylindrical portion in the radial direction.

Preferably, the lever portion can be detached from the cylindrical portion, and positional adjustment thereof is possible in the circumferential direction relative to the cylindrical portion. With this configuration, it is possible to dispose the lever portion in a more appropriate position.

Preferably, the rolling body is disposed between the spool shaft and the outer ring.

The one-way clutch can further comprise an inner ring that is attached to the spool shaft. In this embodiment, the rolling body is disposed between the inner ring and the outer ring.

According to the present invention, it is possible to suppress the generation of rotational resistance during reeling.

BRIEF DESCRIPTION OF THE DRAWINGS

Referring now to the attached drawings which form a part of this original disclosure.

DETAILED DESCRIPTION OF THE EMBODIMENTS

Embodiments of the dual-bearing reel according to the present invention will be described below, with reference to the drawings. The "axial direction" is the direction in which the spool shaft extends. Further, the "radial direction" is the radial direction of a circle having the spool shaft at the center thereof, and the circumferential direction is the circumferential direction of the circle having the spool shaft at the center thereof.

Figure 1:
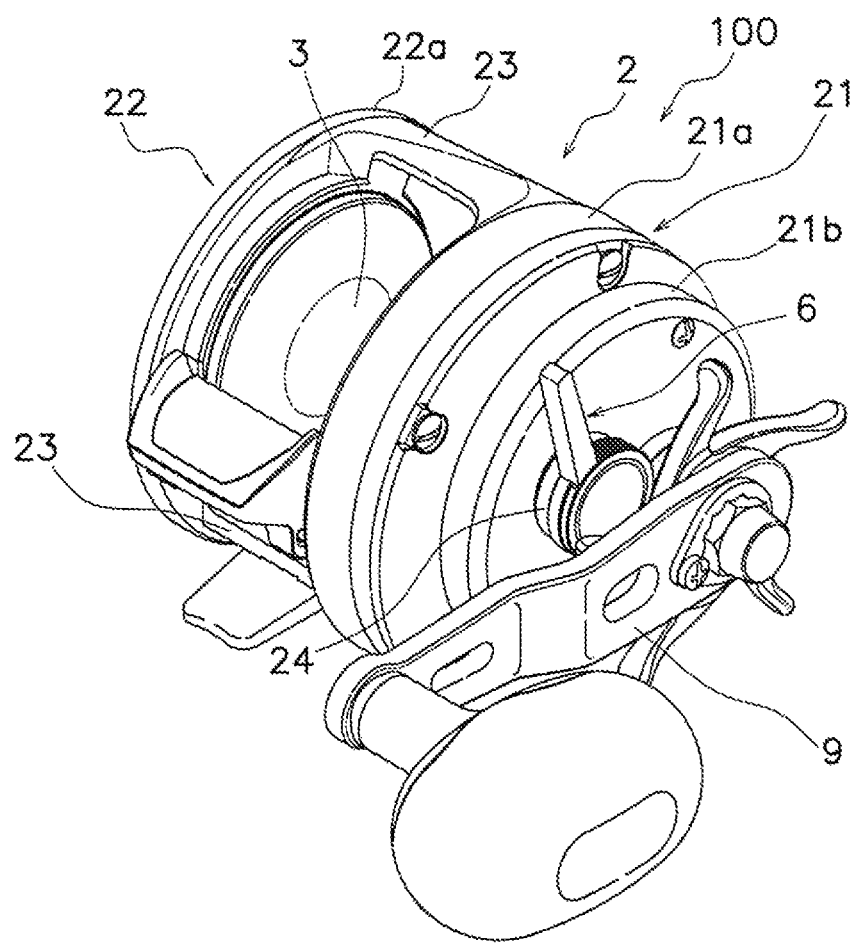
FIG. 1 is a perspective view of a dual bearing reel.
Figure 2:
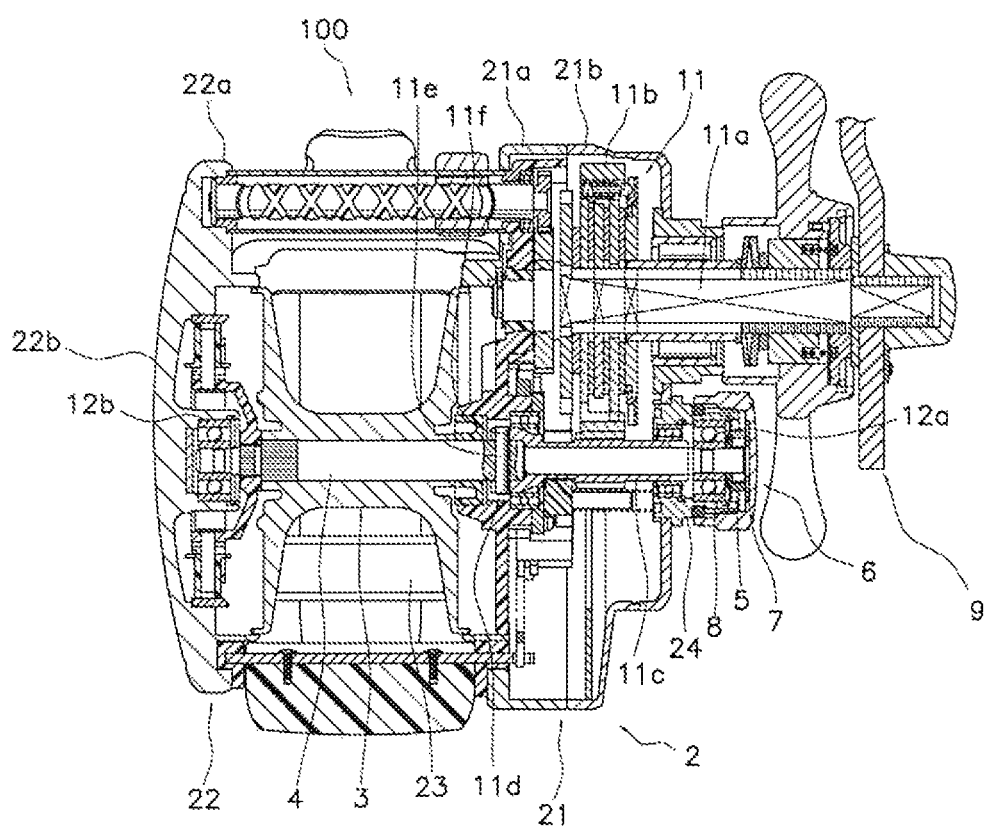
FIG. 2 is a cross-sectional view of the dual bearing reel of FIG. 1.

As shown in FIG. 1 and FIG. 2, the dual-bearing reel 100 comprises a reel body 2, a spool 3, a spool shaft 4, a one-way clutch 5, and an operating lever 6. The dual-bearing reel 100 further comprises a first friction plate 7, a biasing member 8, and a handle 9.

The reel body 2 comprises a first reel body portion 21 and a second reel body portion 22. The first reel body portion 21 and the second reel body portion 22 are disposed at an interval from each other in the axial direction. The first reel body portion 21 and the second reel body portion 22 are coupled to each other via multiple connecting members 23.

The first reel body portion 21 comprises a first side plate 21a, and a first side cover 21b. The first reel body portion 21 defines a housing space inside. A rotation transmission mechanism 11 and the like are houses in this housing space. The second reel body portion 22 comprises a second side plate 22a and a second side cover 22b. The first side plate 21a and the second side plate 22a are coupled to each other via the connecting members 23. The first side plate 21a, second side plate 22a, and connecting members 23 are integrally formed, and form a frame of the reel body 2.

Figure 3:
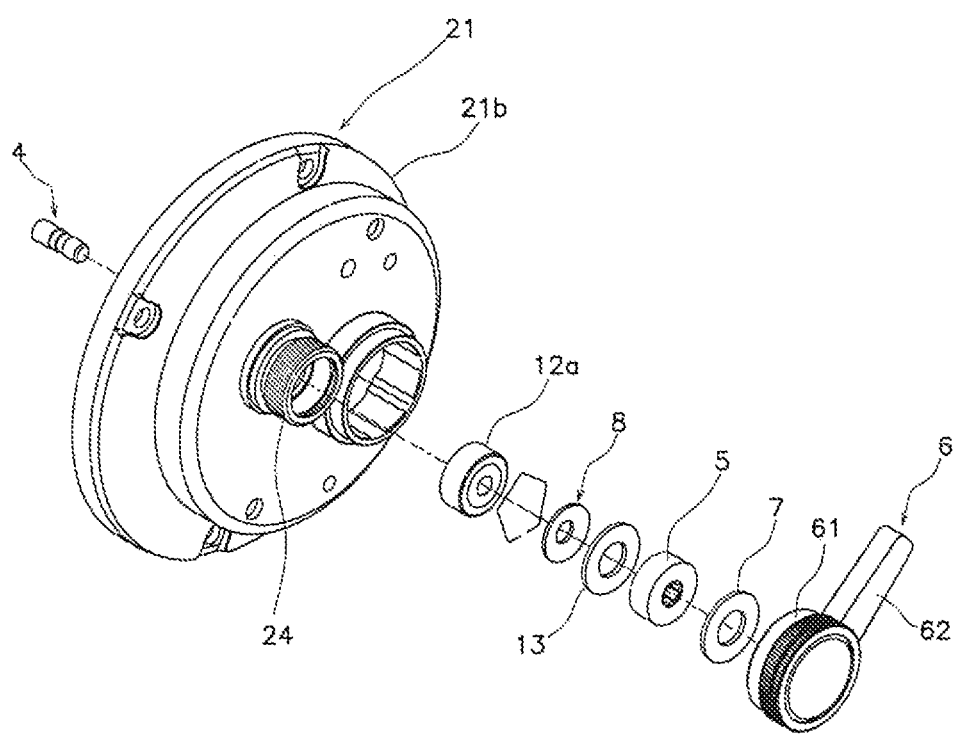
FIG. 3 is an exploded perspective view of the dual-bearing reel of FIG. 1.

As shown in FIG. 3, the first reel body portion 21 further comprises a protrusion 24. The protrusion 24 has a cylindrical shape, and protrudes axially outward. In particular, the protrusion 24 protrudes radially outward from the first cover 21b. The operating lever 6 is attached to this protrusion 24. In particular, the operating lever 6 is attached to the protrusion 24. The protrusion 24 communicates the housing space of the first reel body portion 21 with the outside. One of the ends of the spool shaft 4 is rotatably supported in the protrusion 24.

As shown in FIG. 2, the spool 3 is disposed between the first reel body portion 21 and the second reel body portion 22. In particular, the spool 3 extends in the axial direction and has a substantially cylindrical shape. The spool 3 is rotatable relative to the reel body 2. The spool 3 is rotatably supported to the reel body 2 via the spool shaft 4.

The spool shaft 4 is integrally rotatable with the spool 3. The spool shaft 4 is rotatably supported by the first reel body portion 21 and the second reel body portion 22. The spool shaft 4 is rotatably supported to the first reel body portion 21 and the second reel body portion 22 via a first and second axle bearing members 12a, 12b.

Figure 4:
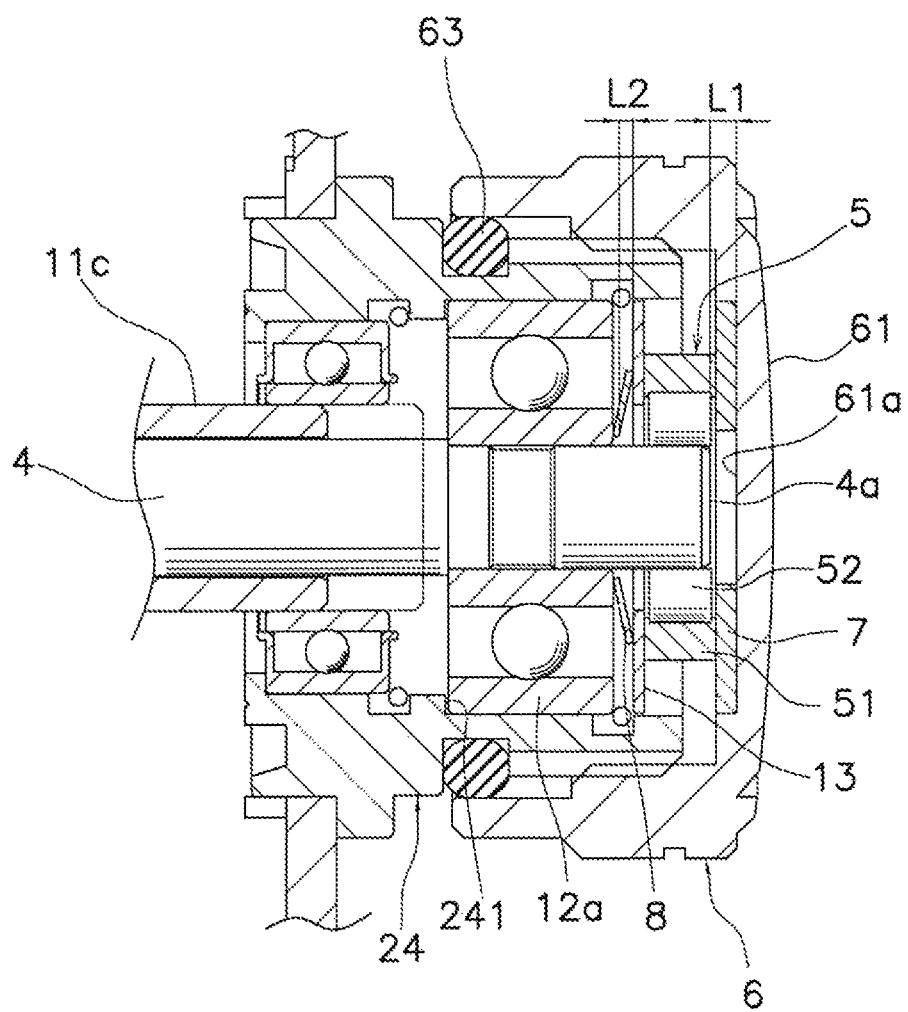
FIG. 4 is an enlarged cross-sectional view of the dual-bearing reel of FIG. 1.

As shown in FIG. 4, the one-way clutch 5 is attached to the spoof 4. The one-way clutch 5 comprises an outer ring 51 and multiple rolling bodies 52. The outer ring 51 is rotatable relative to the reel body 2. In particular, the outer ring 51 is rotatable relative to the protrusion 24. The outer ring 51 is disposed with a gap between the inner perimeter surface of the protrusion 24.

The outer ring 51 is sandwiched between the first friction plate 7 and a second friction plate 13. That is, the rotation of the outer ring 51 is braked by the first and second friction plates 13.

The rolling body 52 is disposed between the spool shaft 4 and the outer ring 51. The rolling body 52 transmits the rotation of the spool shaft 4 in the casting direction to the outer ring 51. On the other hand, the rolling body 52 does not transmit the rotation of the spoof shaft 4 in the reeling direction to the outer ring 51.

As shown in FIG. 3, the operating lever 6 is attached to the reel body 2 and extends in the radial direction. In particular, the operating lever 6 is attached to the protrusion 24 of the reel body 2. Accordingly, the operating lever 6 is pivotable relative to the reel body 2. When the operating lever 6 is pivoted, the operating lever 6 moves in the axial direction. The operating lever 6 is capable of adjusting the braking force that brakes the rotation of the outer ring 51. In particular, the force that presses the outer ring 51 can be adjusted, and the braking force with respect to the outer ring 51 can be adjusted, by pivoting and moving the operating lever 6 in the axial direction.

The operating lever 6 comprises a cylindrical portion 61 and a lever portion 62. The cylindrical portion 61 is attached to the protrusion 24. Accordingly, the cylindrical portion 61 is capable of moving in the axial direction by rotation. The lever portion 62 extends from the cylindrical portion 61 in the radial direction. As shown in FIG. 4, a seal member 63 is disposed between the inner perimeter surface of the cylindrical portion 61 and the outer perimeter surface of the protrusion 24. The seal member 63 prevents intrusion of foreign objects into the reel body 2. Further, the seal member 63 imparts rotational resistance to the operating lever 6 so that the operating lever 6 will not rotated contrary to the intention of the angler.

The first friction plate 7 is disposed between the outer ring 51 of the one-way clutch 5 and the operating lever 6. The first friction plate 7 is an annular plate and is in contact with the outer ring 51. While in contact with the outer ring 51, the first friction plate 7 is not in contact with the rolling body 52. The first friction plate 7 is, for example, made of carbon cloth. The operating lever 6 presses the outer ring 51 in the axial direction via the first friction plate 7.

The biasing member 8 biases the outer ring 51 of the one-way clutch 5 toward the operating lever 6. That is, the biasing member 8 biases the outer ring 51 so that the outer ring 51 does not separate from the first friction plate 7. Meanwhile, the biasing member 8 biases the outer ring 51 via the second friction plate 13. The second friction plate 13 is an annular shape, and is in contact with the outer ring 51 of the one-way clutch 5. Meanwhile, the second friction plate 13 is not in contact with the rolling body 52.

The axial movement of the biasing member 8 in a direction away from the one-way clutch 5 is restricted. Specifically, the biasing member 8 is supported by the first axle bearing member 12a. The movement of this first axle bearing member 12a in a direction away from the one-way clutch 5 is restricted by a stepped portion 241 that is formed on the inner perimeter surface of the protrusion 24.

The biasing member 8 is, for example, a disc spring. The outer perimeter part of the biasing member 8 biases the outer ring 51 of the one-way clutch 5 via the second friction plate 13. Further, the inner perimeter part of the biasing member 8 is supported by the inner ring of the first axle bearing member 12a.

The distance L1 between one end surface 4a of the spool shaft 4 and a bottom surface 61a of the cylindrical portion 61 of the operating lever 6 in the axial direction is greater than the expansion amount L2 of the biasing member 8 between an uncompressed state and a maximum compression state (L1>L2). Accordingly, even if the biasing member 8 is completely compressed, the end surface 4a of the spool shaft 4 does not contact the bottom surface 61a of the cylindrical portion 61.

As shown in FIG. 2, the handle 9 is a member for rotating the spool shaft 4, and is rotatably mounted to the first reel body portion 21. When the handle 9 is rotated, the spool shaft 4 is rotated via a rotation transmission mechanism 11.

The rotation transmission mechanism 11 is a mechanism for transmitting the rotation of the handle 9 to the spool shaft 4. The rotation transmission mechanism 11 comprises a drive shaft 11a, a drive gear 11b, a pinion gear 11c, and a clutch mechanism 11d. The drive shaft 11a is integrally rotated with the handle 9. The drive gear 11b is integrally rotated with the drive shaft 11a. The pinion gear 11c meshes with the drive gear 11b. The pinion gear 11c has a cylindrical shape, and the spool shaft 4 extends through the interior of the pinion gear 11c.

The clutch mechanism 11d transmits or cuts off the rotation of the pinion gear 11c to the spool shaft 4. Specifically, the clutch mechanism 11d is formed from an engagement pin 11e and an engagement recess 11f. The engagement pin 11e extends through the spool shaft 4 in the radial direction. The engagement recess 11f is a recess that is formed at one end of the pinion gear 11c. The rotation of the pinion gear 11c is transmitted to the spool shaft 4 by the engagement pin 11e being engaged with the engagement recess 11f. On the other hand, when the engagement between the engagement pin 11e and the engagement recess 11f is released by the pinion gear 11c being moved in a direction away from the engagement pin 11e, the rotation of the pinion gear 11c is not transmitted to the spool shaft 4.

Next, the operation of the dual-bearing reel 100 will be described. At the time of casting in which a fishing line is unreeled from the spool 3, the spool shaft 4 is rotated in the line delivering direction. The rotation of this spool shaft 4 in the line delivering direction is transmitted to the outer ring 51 via the rotating body 52 of the one-way clutch 5, thereby rotating the outer ring 51. The outer ring 51 is pressed by the operating lever 6 via the first friction plate 7. That is, since the outer ring 51 is braked by the operating lever 6, the rotational speed of the outer ring 51 is suppressed. Since the outer ring 51 and the spool shaft 4 are interlocked, the rotation speed of the spool shaft 4 at the time of casting is also suppressed, and backlash is prevented.

Further, when the operating lever 6 is pivoted, the operating lever 6 is moved in the axial direction; therefore, the pressing force of the operating lever 6 with respect to the outer ring 51 can be adjusted. That is, the braking force with respect to the spool shaft 4 can be adjusted by pivoting the operating lever 6.

On the other hand, when winding the fishing line, the spool shaft 4 is rotated in the reeling direction. The rolling body 52 does not transmit the rotation of the spool shaft 4 in the reeling direction to the outer ring 51. That is, the spool shaft 4 and the outer ring 51 will not be interlocked, and the braking force by the operating lever 6 will not act on the spool shaft 4. Therefore, the rotational resistance by the operating lever 6 will not be generated in the spool shaft 4 at the time of reeling, and the spool shaft 4 can be rotated smoothly.

One embodiment of the present invention was described above, but the present invention is not limited to the above-described embodiment, and various modifications can be made without departing from the scope of the invention.

Figure 5:
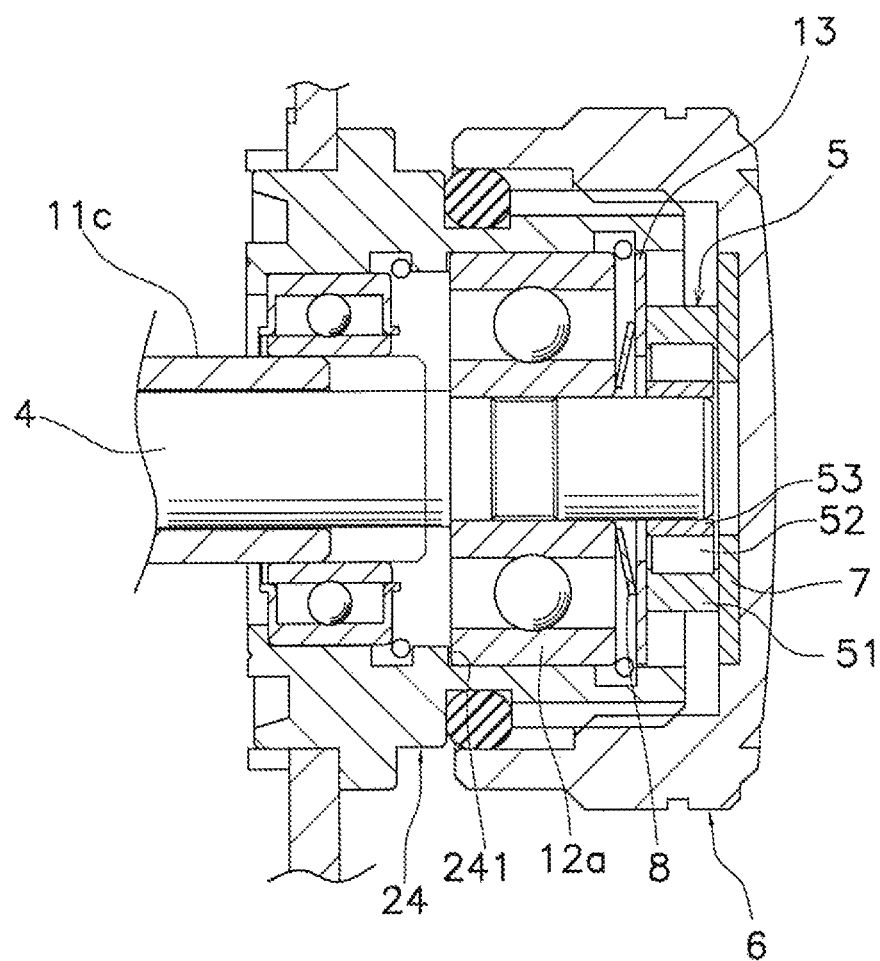
FIG. 5 is an enlarged cross-sectional view of a dual-bearing reel according to a modified example.
Figure 6:
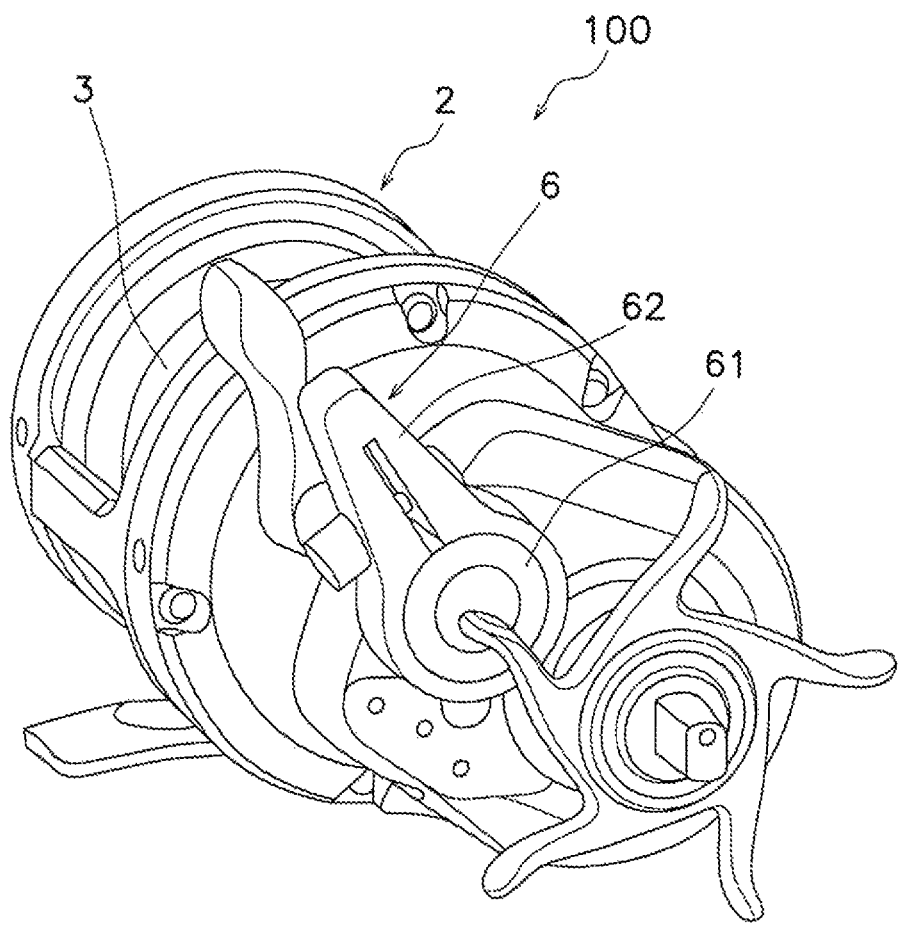
FIG. 6 is a perspective view of the dual-bearing reel according to the modified example.

For example, as shown in FIG. 5, the one-way clutch 5 may further comprise an inner ring 53. The inner ring 53 is attached to the spool shaft 4. The roll 52 is disposed between As shown in FIG. 6, the operating lever 6 may be configured so that the lever portion 62 is detachable from the cylindrical portion 61. Further, positional adjustment of the lever portion 62 is possible in the circumferential direction relative to the cylindrical portion 61. For example, the lever portion 62 is attached to the cylindrical portion 61 so as to clamp the cylindrical portion 61 from the radially outer side. With this configuration, the lever portion 62 can be detached from the cylindrical portion 61. Further, the lever portion 62 may be attached to the cylindrical portion 61 in an appropriate circumferential position thereof.

In the embodiment described above, the biasing member 8 is supported in the axial direction by the first axle bearing member 12a, but no limitation is imposed thereby. For example, the biasing member 8 may be supported by a stepped portion formed on the inner perimeter surface of the protrusion 24.

In the embodiment described above, the one-way clutch 5 is disposed in the first reel body portion 21, but the one-way clutch 5 may be disposed in the second reel body portion 22 as well. In this embodiment, the operating lever 6 is also pivotably attached to the second reel body portion 22. Meanwhile, the operating lever 6 may be disposed in the second reel body portion 22 as well. In this embodiment, a portion of the operating lever 6 is exposed from the outer perimeter surface of the second reel body portion 22.

What is claimed is:

1. A dual-bearing reel, comprising:
   a reel body;
   a spool rotatable relative to the reel body;
   a spool shaft configured to integrally rotate with the spool;
   a one-way clutch comprising an outer ring rotatable relative to the reel body and a rolling body configured to transmit rotation of the spool shaft in the casting direction to the outer ring, the one-way clutch being attached to the spool shaft; and
   an operating lever attached to the reel body so as to extend in a radial direction, and configured to adjust a braking force that brakes rotation of the outer ring.

2. The dual-bearing reel recited in claim 1, wherein
   the operating lever is pivotably attached to the reel body, and
   the operating lever is configured to adjust the braking force by pivoting.

3. The dual-bearing reel recited in claim 1, wherein
   the operating lever is attached to the reel body and configured to press the outer ring in an axial direction.

4. The dual-bearing reel recited in claim 1, further comprising
   a friction plate disposed between the outer ring and the operating lever.

5. The dual-bearing reel recited in claim 1, further comprising
   a biasing member configured to bias the outer ring toward the operating lever.

6. The dual-bearing reel recited in claim 1, wherein
   the operating lever is attached to the reel body, and comprises
   a cylindrical portion that is movable in an axial direction by rotation, and
   a lever portion extending from the cylindrical portion in the radial direction.

7. The dual-bearing reel recited in claim 6, wherein
   the lever portion is configured to be detached from the cylindrical portion, and positionally adjusted in a circumferential direction relative to the cylindrical portion.

8. The dual-bearing reel recited in claim 1, wherein
   the rolling body is disposed between the spool shaft and the outer ring.

9. The dual-bearing reel recited in claim 1, wherein
   the one-way clutch further comprises
   an inner ring attached to the spool shaft, and
   the rolling body being disposed between the spool shaft and the outer ring.

\* \* \* \* \*